(12) United States Patent
Xidacis

(10) Patent No.: US 7,923,657 B2
(45) Date of Patent: Apr. 12, 2011

(54) METHOD AND APPARATUS FOR ELECTRODE DRESSING

(75) Inventor: Alexander Xidacis, Derby (GB)

(73) Assignee: Rolls-Royce plc, London (GB)

( * ) Notice: Subject to any disclaimer, the term of this patent is extended or adjusted under 35 U.S.C. 154(b) by 1158 days.

(21) Appl. No.: 11/594,817

(22) Filed: Nov. 9, 2006

(65) Prior Publication Data

US 2007/0084833 A1 Apr. 19, 2007

Related U.S. Application Data

(63) Continuation of application No. PCT/GB2005/001387, filed on Apr. 12, 2005.

(30) Foreign Application Priority Data

May 18, 2004 (GB) .................................. 0410999.7

(51) Int. Cl.
*B23H 1/04* (2006.01)
(52) U.S. Cl. ..................................... 219/69.15; 451/178
(58) Field of Classification Search ............... 219/69.11, 219/69.15, 69.17, 69.2; 125/3, 4, 5; 451/177, 451/178, 179; 409/140
See application file for complete search history.

(56) References Cited

U.S. PATENT DOCUMENTS

| 1,216,387 | A | * | 2/1917 | Winter ........................... 451/178 |
| 3,872,555 | A | * | 3/1975 | Link et al. .................... 24/590.1 |
| 3,962,557 | A | * | 6/1976 | Buck ........................... 219/69.15 |
| 4,596,066 | A | * | 6/1986 | Inoue ........................... 219/69.15 |
| 4,754,115 | A |   | 6/1988 | Rhoades |
| 5,103,244 | A | * | 4/1992 | Gast et al. ....................... 347/33 |
| 5,396,040 | A | * | 3/1995 | Girardin .................... 219/69.15 |
| 5,899,796 | A | * | 5/1999 | Kamiyama et al. ........... 451/178 |
| 2002/0179572 | A1 | | 12/2002 | McPhillips |

FOREIGN PATENT DOCUMENTS

| CA | 2 363 581 A | | 5/2003 |
| GB | 2 028 211 A | | 3/1980 |
| JP | 57096730 A | | 6/1982 |
| JP | 58-15630 A | * | 1/1983 |
| JP | 63-7233 A | * | 1/1988 |
| JP | 5-77111 A | * | 3/1993 |

* cited by examiner

*Primary Examiner* — Geoffrey S Evans
(74) *Attorney, Agent, or Firm* — Jeffrey S. Melcher; Manelli Denison & Selter PLLC

(57) ABSTRACT

An electric discharge machine template fixture (40) suitable for EDM redressing operations, the fixture (40) comprising a body (42) capable of holding a template (50) and capable of rotating the template (50) about its central axis (58) for consecutive redressing operations.

22 Claims, 7 Drawing Sheets

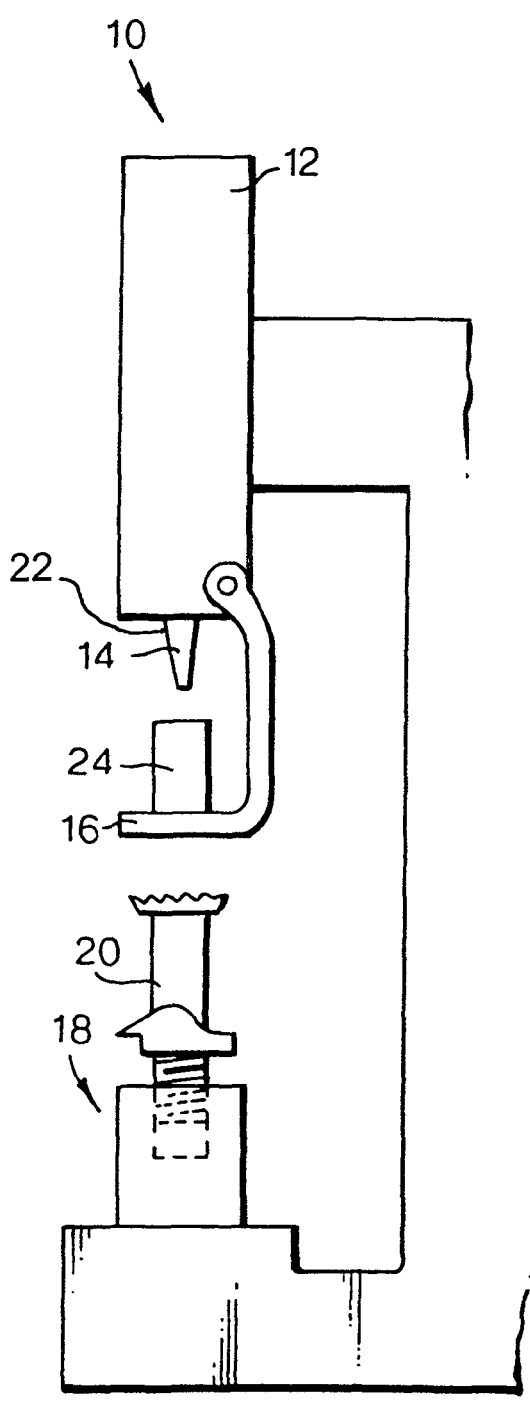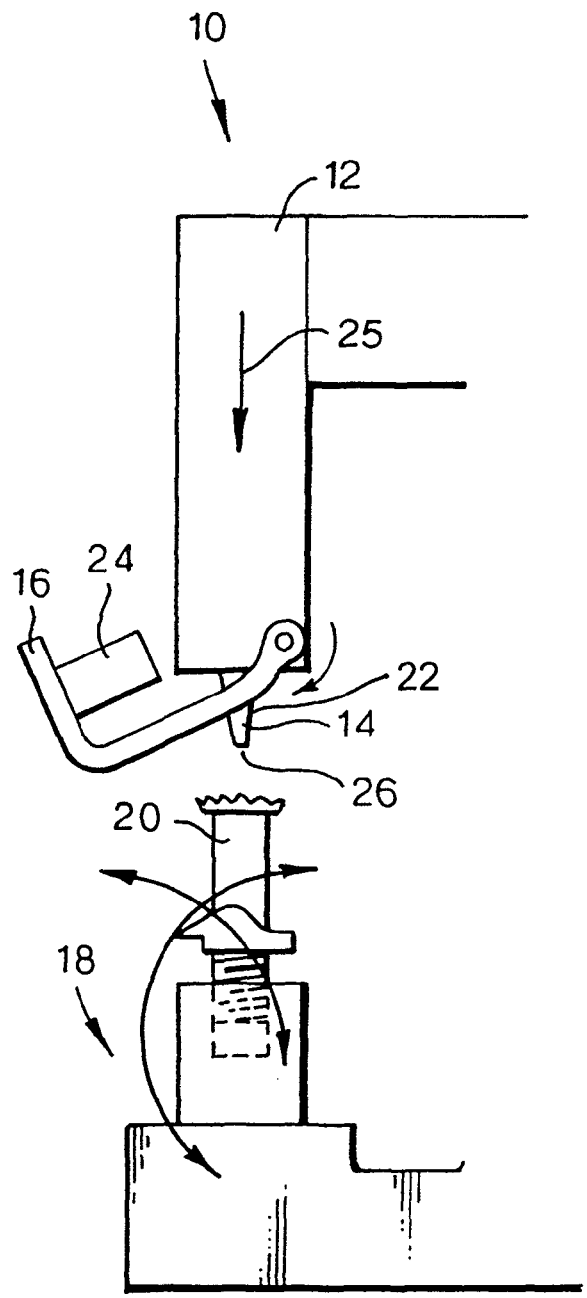
PRIOR ART

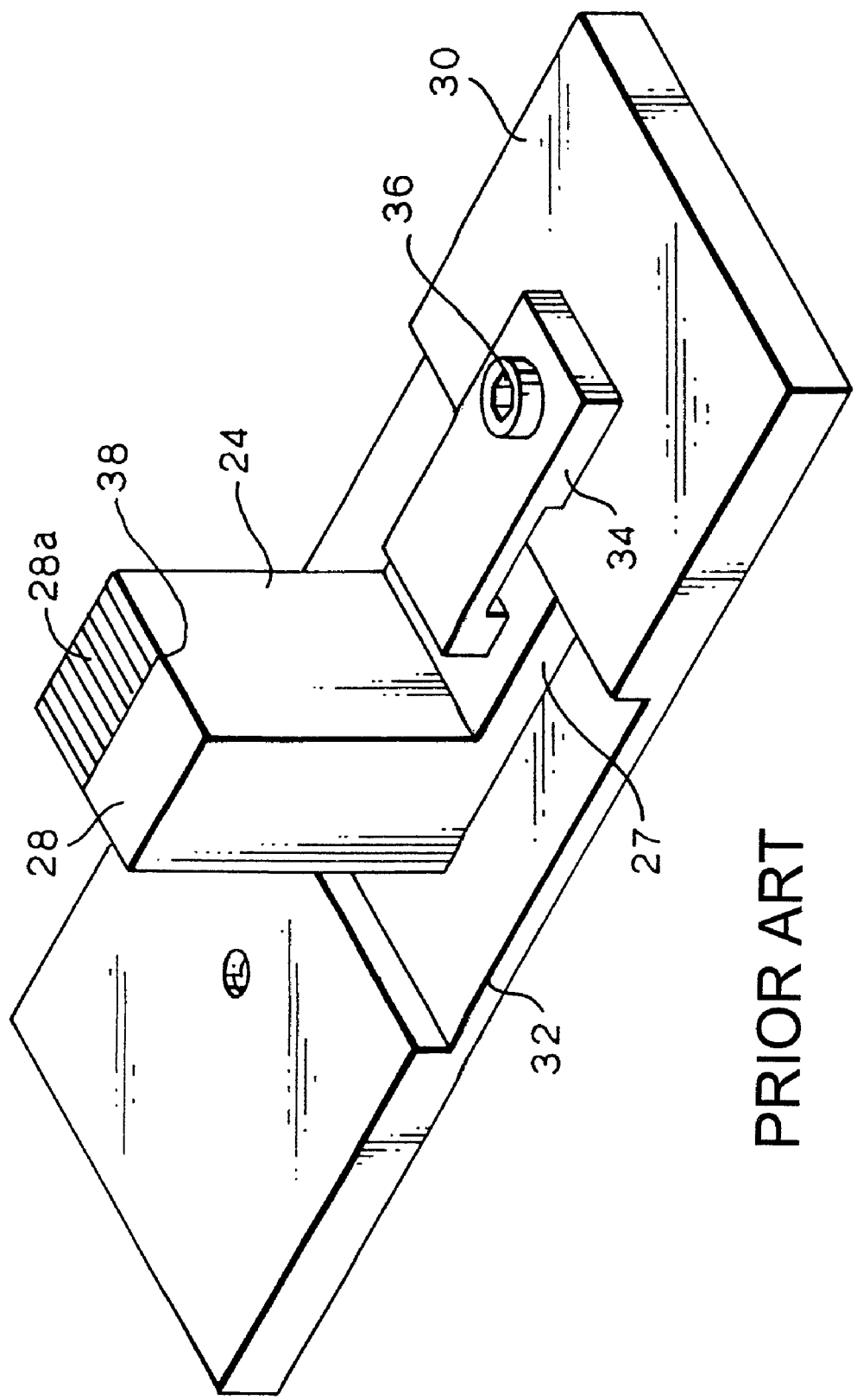

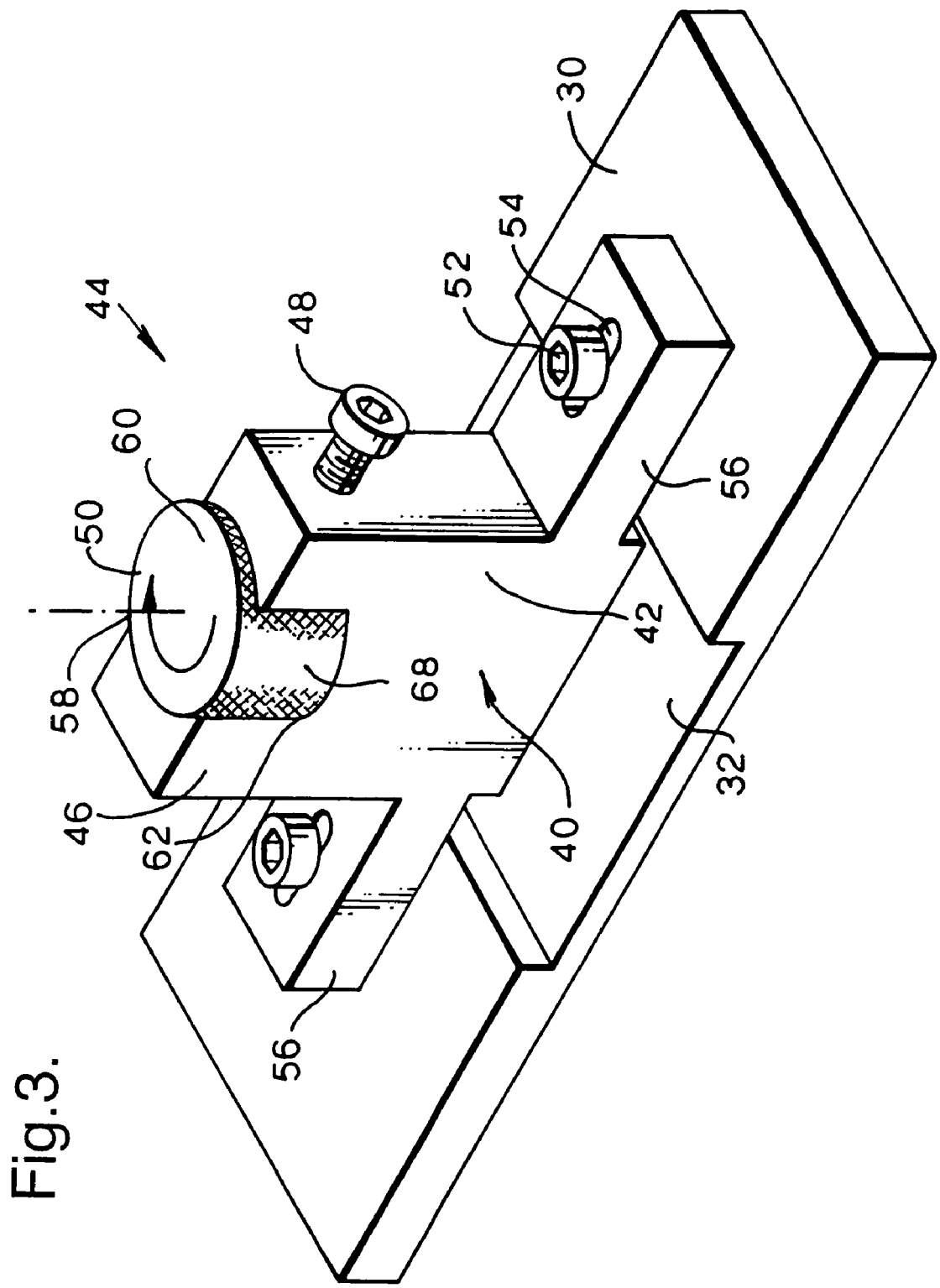

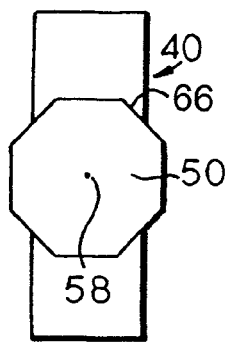
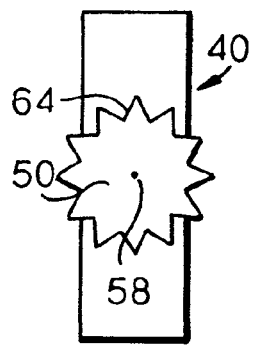
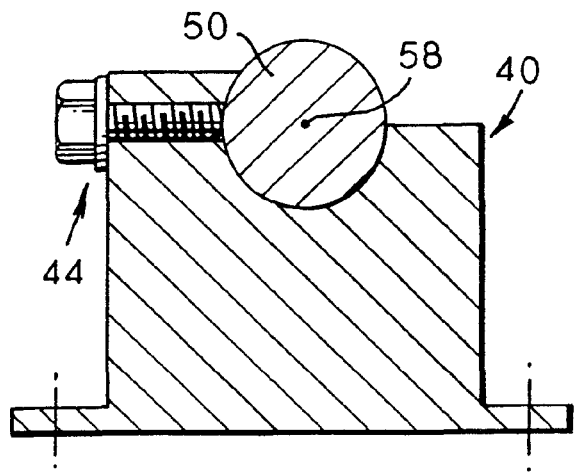
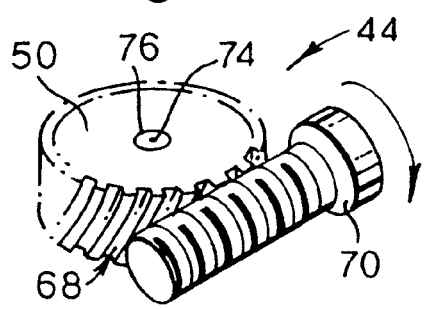
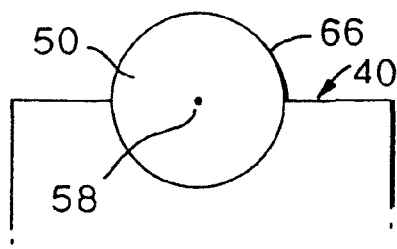
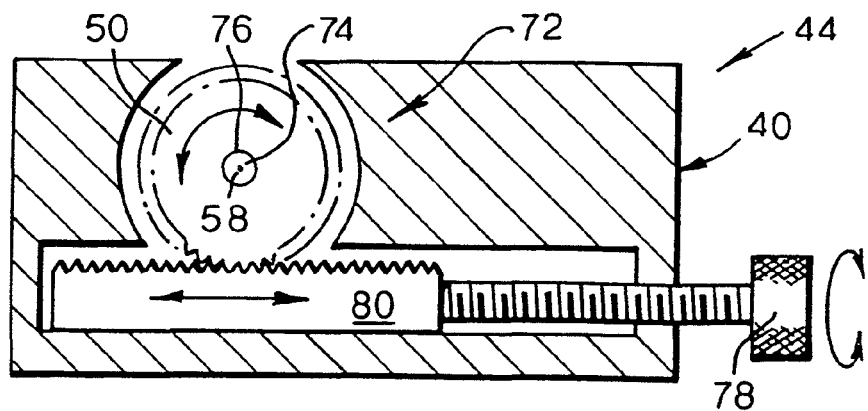

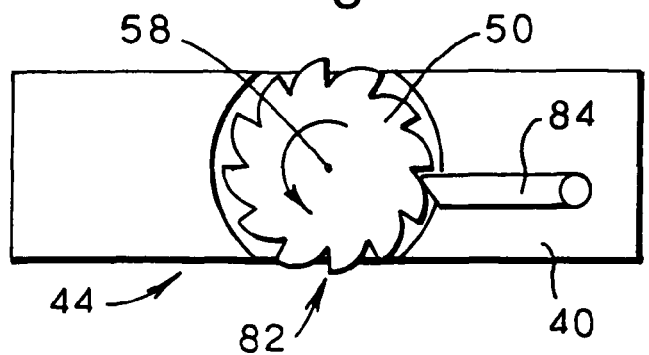
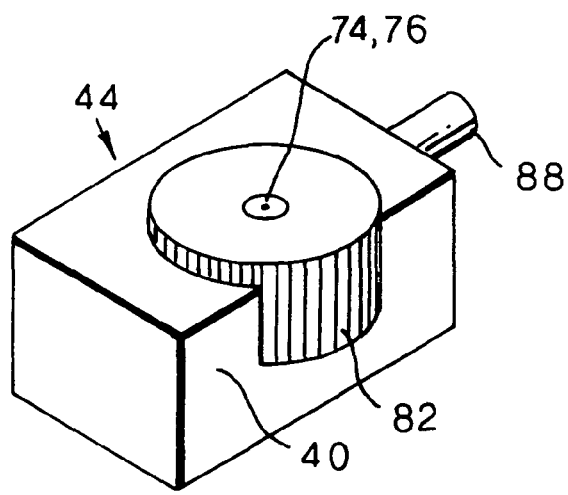
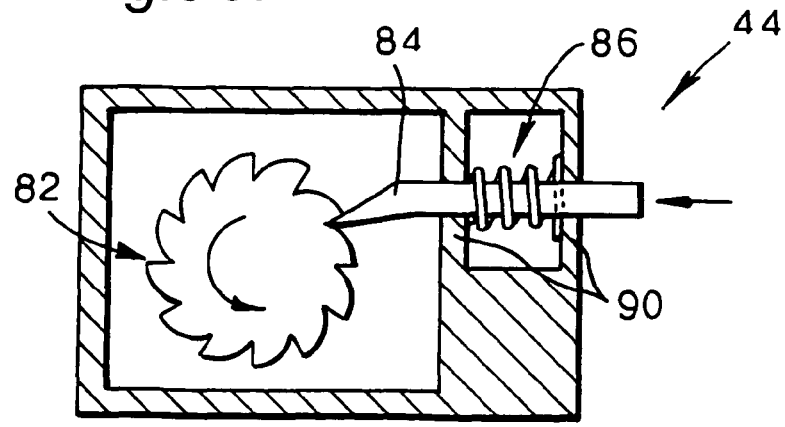

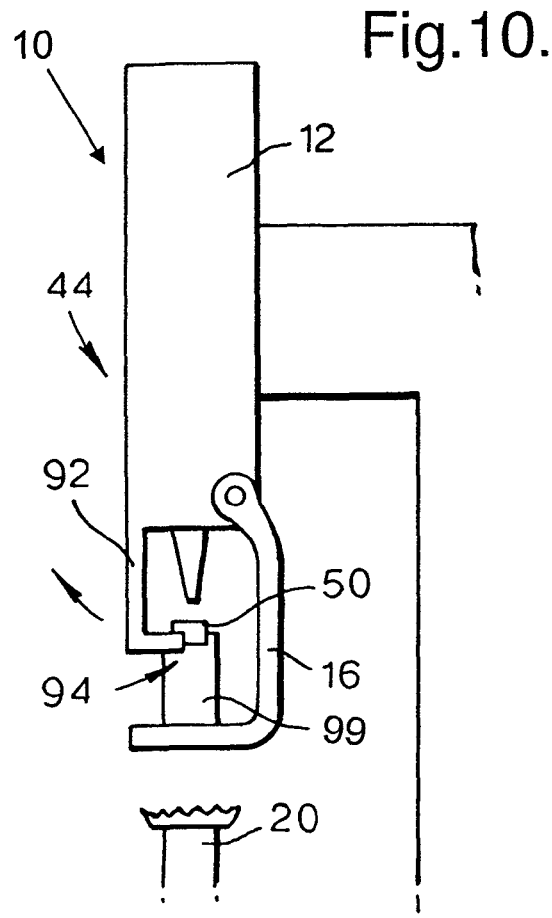
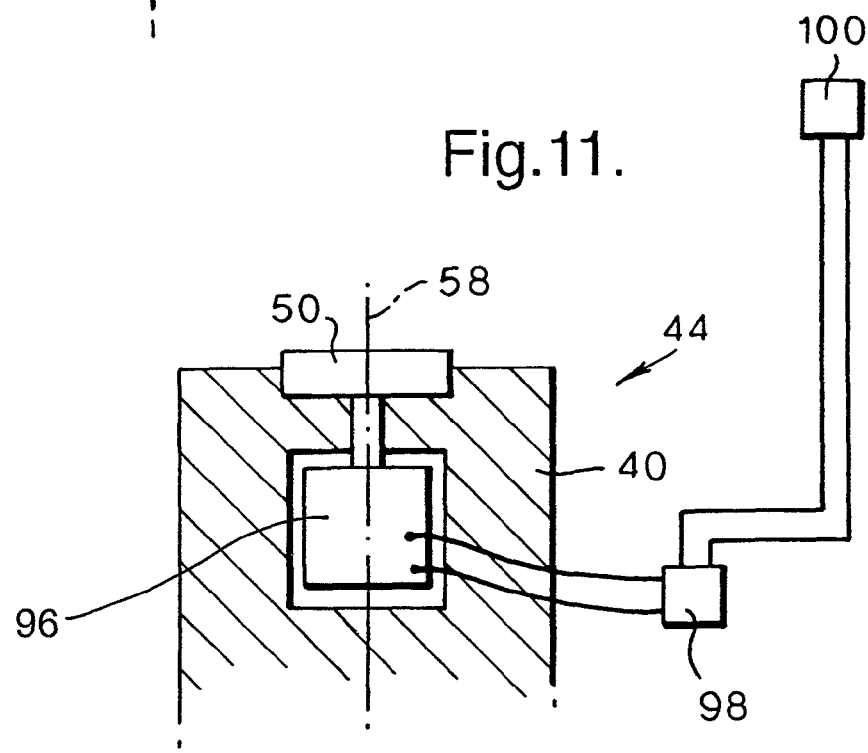

_US 7,923,657 B2_

METHOD AND APPARATUS FOR ELECTRODE DRESSING

CROSS-REFERENCE TO RELATED APPLICATIONS

This is a continuation of International Application Number PCT/GB2005/001387 filed Apr. 12, 2005, designating the United States, which claims priority to GB 0410999.7, filed May 18, 2004.

BACKGROUND OF THE INVENTION

The present invention relates to a method and apparatus for electrode dressing of an Electro Discharge Machining (EDM) suitable for creating holes in components.

In one known example, electro discharge machining is used to form cooling holes in turbine blades of a gas turbine engine. One cause of defects and non-conformance for holes in blades is wear on the electrode. To avoid wear, the electrode is redressed prior to cutting each hole. The redressing operation is carried out, typically, on a copper template. The "squarer" the end of the electrode after redressing, the cleaner the subsequent hole cut in the turbine blade. In order to ensure that the electrode is redressed properly, the template used for redressing should comprise a smooth, un-pitted surface. In the known process, the operator manually unclamps, adjusts the position of the copper template and reclamps, for each operation, so that the electrode contacts an un-pitted area.

This re-adjustment operation is awkward and time consuming due to this clamping method (see FIG. 1) and as a result, is not always carried out by the operator, hence cooling holes are not always formed properly. This can lead to inadequate cooling fluid flow and unwanted thermal gradients throughout the component, reducing its service life. Furthermore, the manual adjustment is imprecise and the template is often underused or the electrode is presented to a pitted region where poor redressing also results in a substandard hole being formed in the component.

SUMMARY OF THE INVENTION

Therefore it is an object of the present invention to provide an electric discharge machine template fixture suitable for EDM electrode redressing operations, the fixture comprising a body having means capable of holding a template and characterised in that the means is capable of allowing rotation of the template about its central axis for consecutive redressing operations.

Preferably, the central axis is arranged substantially parallel to the direction of travel of the electrode in the redressing operation.

Alternatively, the central axis is arranged substantially perpendicular to the direction of travel of the electrode in the redressing operation.

Preferably, the means to hold a template comprises a formation generally conforming to the shape of the template and the formation and the template are substantially circular or part circular.

Alternatively, the formation and template are polygonal or part polygonal and the number of sides of the polygon conforms to the number of times the template is capable of being part rotated in one complete revolution.

Alternatively, the formation comprises interlocking features which are capable of interlocking with corresponding features formed on the template. The number of interlocking features conforms to the number of times the template is capable of being part rotated in one complete revolution.

Preferably, the fixture comprises a holding means capable of engaging the template to prevent rotation thereof. The holding means capable of engaging the template to prevent rotation thereof comprises a retaining bolt mounted within the fixture. Alternatively the holding means, capable of engaging the template to prevent rotation thereof, comprises a sprung arm attached to the fixture and which is capable of engaging a template, which comprises an annular array of angled teeth, the shape of the teeth and the arrangement of the arm allow rotation only in one direction of a predetermined amount.

Alternatively, the means to hold a template and allow rotation comprises a worm threaded bolt, disposed to the fixture, and arranged to engage a corresponding thread formed by the outer circumferential surface of the template.

Alternatively, the means to hold a template and allow rotation thereof comprises a rack and pinion arrangement, in use rotation of a bolt, drivingly connected to the rack, drives the rack, which engages and rotates the pinion (template) about its axis.

Alternatively, the means to hold a template and allow rotation thereof comprises a sprung arm attached to the fixture and capable of engaging a complimentarily shaped template, the template comprising an annular array of angled teeth. The sprung arm mechanism comprises a button extending from a surface of a fixture, the sprung mechanism is captured between lands of the fixture, and comprises a spring 86 or other similar resilient means to provide a returning force to the arm subsequent to a user pressing the button and capable of rotating the template a predetermined amount.

Alternatively, the means to hold a template and allow rotation thereof comprises an extension of a static part, such as an associated EDM. The extension comprises a means to engage the template and rotate it, such a means comprises an arm capable of engaging teeth formed on the template, thus when the arm automatically swings away from and back to the EDM, the arm rotates the template a predetermined amount.

Alternatively, the means to hold a template and allow rotation thereof comprises a motor drivingly connected to the template. The motor is housed in the fixture. Preferably, the motor is connected to a control device, the control device is capable of automatically powering the motor in response to and during a machining operation.

Preferably, an electric discharge machine template fixture as claimed in any one of the paragraphs above wherein an indicator, audible or visual, is provided and is capable of warning the user that a complete rotation of contact points has been completed or requires replacement and that the template requires turning over or the fixture requires moving.

Preferably, an electric discharge machine comprises an electric discharge machine template fixture as claimed in any one of the above paragraphs.

According to another aspect of the present invention there is provided an electric discharge machine template suitable for use in a complimentary electric discharge machine template fixture and capable of redressing an EDM electrode, characterised in that the template is polygonal or part polygonal. Preferably the polygon conforms to the number of times the template is capable of being part rotated in one complete revolution of the fixture.

According to another aspect of the present invention there is provided an electric discharge machine template suitable for use in a complimentary electric discharge machine template fixture and capable of redressing an EDM electrode, characterised in that the template comprises interlocking features which are capable of interlocking with corresponding features formed by the fixture. Preferably, the number of interlocking features conforms to the number of times the template is capable of being part rotated in one complete revolution.

According to another aspect of the present invention there is provided an electric discharge machine template suitable for use in a complimentary electric discharge machine template fixture and capable of redressing an EDM electrode, the fixture comprises holding means, capable of engaging the template to prevent rotation thereof, having a sprung arm attached to the fixture capable of engaging a template, characterised in that the template comprises an annular array of angled teeth, the shape of the teeth and the arrangement of the arm allow rotation only in one direction of a predetermined amount.

According to a further aspect of the present invention a method of electric discharge machining is provided. The electric discharge machine comprises a housing, an electrode nose guide, a movable arm and a fixture for holding a component to be machined, the movable arm is arranged to carry a template fixture suitable for electrode redressing operations, the method comprises the steps of
  (a) machining the component;
  (b) pivoting the arm into a position to permit redressing of the electrode on the template; characterised in that,
  (c) a template, held in the template fixture, is rotated about its central axis for consecutive redressing operations.

The present invention therefore provides apparatus to improve utilisation of a redressing template, user and operation time, to reduce the scrap rate of components and/or their rework rate, to improve repeatability of redressing the electrode and improve the quality of the hole formed in the component. Each of these advantages significantly reduces the cost of the EDM operation.

BRIEF DESCRIPTION OF THE DRAWINGS

The present invention will be more fully described by way of example with reference to the accompanying drawings in which:

FIGS. 1a and 1b show side views of a prior art EDM method and arrangement;

FIG. 2 is an elevated view of a prior art template holding fixture;

FIG. 3 is a perspective view of a first embodiment of an electric discharge machine template fixture of the present invention;

FIGS. 4a and 4b are plan views of the electric discharge machine template fixture incorporating a second embodiment of the present invention;

FIGS. 5a and 5b are side views of the electric discharge machine template fixture incorporating a third embodiment of the present invention;

FIG. 6 is a perspective view of a means 44 for holding and rotating a template in accordance with a fourth embodiment of the present invention.

FIG. 7 is a plan view of the electric discharge machine template fixture incorporating a fifth embodiment of the present invention;

FIG. 8 is a plan view of the electric discharge machine template fixture incorporating a sixth embodiment of the present invention;

FIG. 9a is a perspective view of the electric discharge machine template fixture incorporating a seventh embodiment of the present invention;

FIG. 9b is a plan view of the means for holding and rotating a template of the seventh embodiment the electric discharge machine template fixture;

FIG. 10 is a side view of part of the EDM showing an eighth embodiment of the present invention;

FIG. 11 is a sectional through the electric discharge machine template fixture showing a ninth embodiment of the present invention.

DETAILED DESCRIPTION OF THE INVENTION

Figure 5C:
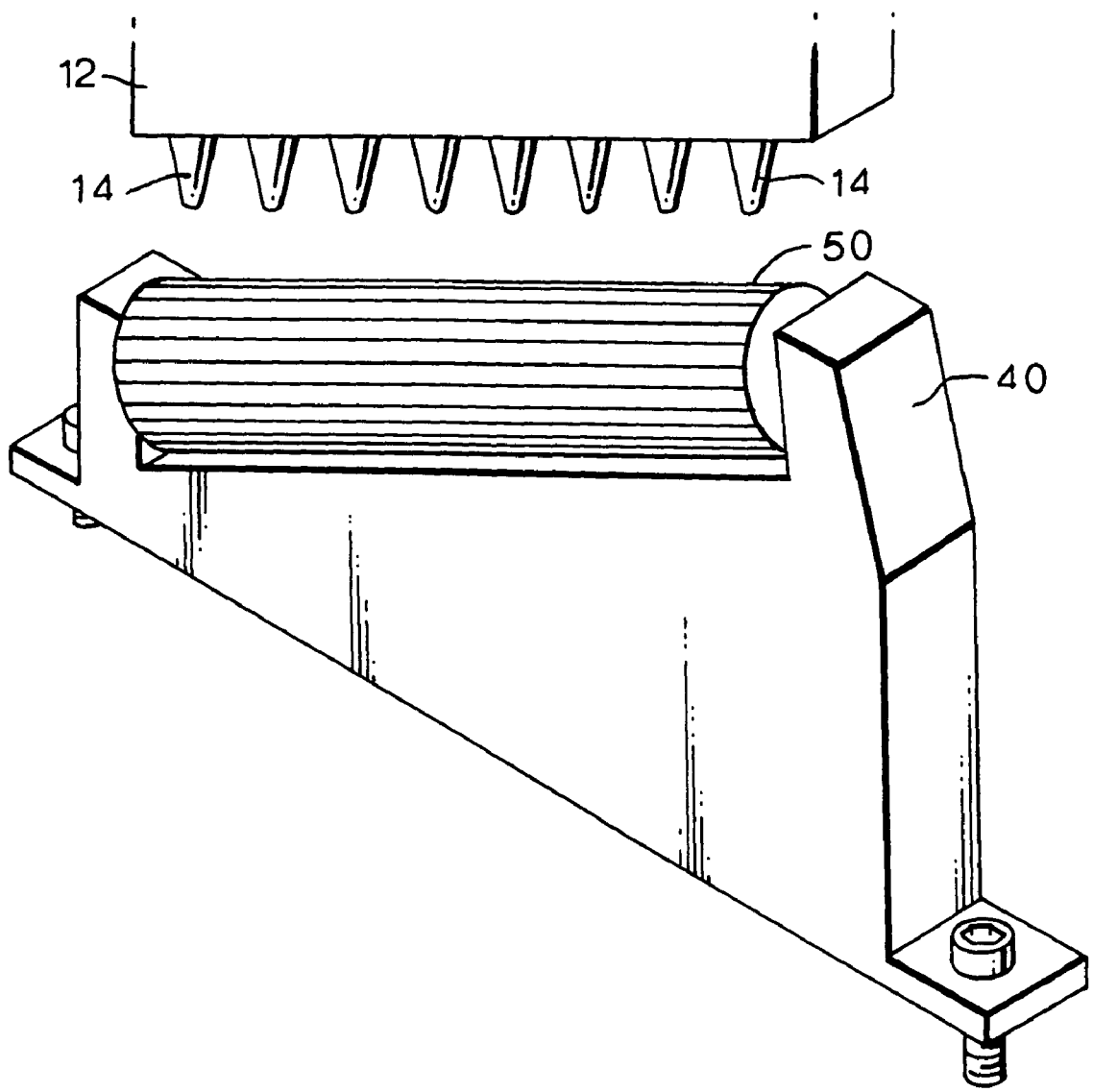
FIG. 5c is a perspective view of the electric discharge machine template fixture in accordance with the third embodiment of the present invention.

With reference to FIGS. 1a and 1b, EDM is used to form cooling holes in turbine blades of a gas turbine engine. The EDM 10 comprises a housing 12, a nose guide 14, a pivotable arm 16 and a fixture 18 for holding a component 20 to be machined. The housing 12 comprises circuitry for supplying electricity to an electrode 22, which extends through and is held by the nose guide 14. The housing 12 also comprises a means to hold and extend the electrode 22 as known in the art. The arm 16 is arranged to hold a redressing template 24 suitable for redressing the electrode 22. The operation of the EDM 10 is well known, but for clarity a brief description is included.

Having first positioned the component 20 on the fixture, capable of multi-axis displacement, the EDM 10 starts its operation cycle by moving the housing 12 and therefore electrode 22 towards (arrow 25) the component 20. The pivoting arm 16 is arranged to automatically pivot away from housing 12 and clear a path to the component 20. When the electrode 22 is positioned accordingly, a high-energy electrical charge is passed through the electrode 22 creating a spark that locally erodes the component 20 to create a desired hole.

During the sparking step, the electrode 22 itself erodes and must therefore be redressed for the next machining operation. It is imperative that the electrode 22 has a flat end surface 26 to present to the component 20, and it is well known that a flat and preferably square end surface 26 produces the cleanest hole.

After forming a hole, the housing 12 containing the electrode 22 is raised back to its starting position (FIG. 1a) where the arm 16, comprising the redressing template 24 is swung back down. The electrode 22 is then brought into contact with the redressing template 24 and the electrical current reversed causing the electrode 22 to be redressed with a flat and preferably square end surface 26.

Referring to FIG. 2, the redressing template 24 is in the form of a rectangular block of copper comprising an upper or redressing surface 28 and a foot 27 extending from the opposite end of the template 24. The template 24 is held on a base 30, itself attachable to the arm 16, by a plate 34 and bolt 36 arranged to clamp against the foot 27.

The template 24 adjustment method is as follows; loosen bolt 36 holding down the clamp plate 34, move the template to new position and re-tighten the bolt 36. A mechanical advantage must be used to tighten the bolt 36 because the plate 34 is not only responsible for allowing adjustments but must also securely hold the template 24 in position. However, if the bolt 36 is over tightened the plate 34 bends and does not return to its original shape afterwards. This makes any following attempt to securely fasten the template 24 difficult.

The main cause of component defects and non-conformance when electro discharge machining cool holes in, for example, turbine blades is a poorly redressed electrode 22 or one that has not been redressed at all. In order to ensure that the electrode 22 is redressed properly, it is necessary to ensure that the contact point between electrode 22 and template 24 has not been pitted by previous redressing operations. Therefore, the redressing operation also comprises the operator moving the template 24 so that the electrode 22 will make contact with an un-pitted part of the surface 28 of the template 24.

Clamping of the foot 27 of the template is also problematic. FIG. 2 shows the template 24 is clamped as far to the right of the base 30 as possible, in a recess 32 defined by the base 30, yet the electrode position (which cannot be altered) only just makes contact with one edge 38 of the template 24. As the foot 27 of the template 24 is required to abut edge of the recess, partly to prevent slip and partly to locate, the foot 27 must be cut away in the workshop to utilise more of the surface 28. As the foot 27 is shortened the template 24 can only move further right.

The size of the surface 28 of the template 24 is also a problem. When the template 24 is swung out of the way to allow the electrode close access to the blade 20 being cut, the operator must ensure that the position, in which the template 24 is set, will not cause it to impede the electrode nose guide 14 during the swing. Again this means that the surface 28 area available for redressing is restricted to about one half of the stop surface 28a. In order to utilise the other half, the template must be rotated 180 degrees and re-clamped on a corresponding foot not shown. Where there is no second foot the template 24 is removed from the machine 12, a portion of the foot removed and replaced in the machine 12.

In order to fully utilise the surface, the operator must use both clamped positions, then shorten the each foot and repeating. The current design of the template means that less than 10% of the copper is actually used before the template must be scrapped. If the template is not regularly adjusted, large pits can form and sometimes, operators will scrap a template before it has been "fully" utilised in order to save on adjustment time.

Further, it will be appreciated that the operator selects the amount of adjustment and direction and thus the number of redressing operations is variable and rarely optimised.

Referring now to FIG. 3, an electric discharge machine template fixture 40 comprises a body 42 having means 44 for holding and rotating a template 50. The means 44 for holding a template 50 comprise a recess 46 defined by the body 42 in the upper surface and a retaining bolt 48 which is capable of engaging to prevent rotation of the template 50. The means 44 for holding a template 50 is capable of allowing the user to rotate the template 50 about its central axis 58.

Thus the fixture 40 is designed to securely hold a substantially cylindrical template 50 for redressing to occur. The fixture 40 allows the electrode 22 to contact the cylindrical template 50 off-centre. This arrangement allows the template 50 to be easily and quickly adjusted between redressing operations to provide a clean surface. Having a cylindrical insert and off-centre contact point combined with a fixed holder base 30, allows for a relatively large surface area to be used but with no possibility of contacting the electrode nose guide 14 during the swinging movement of the arm 16.

The base 30 is the same as the aforementioned base and fits in existing EDM tooling interface. The body 42 is slidably secured to the base 30 by two bolts 52 extending through elongate holes 54 located in the fixture's wings 56.

In an exemplary embodiment, at the top of the fixture 40, a 12 mm diameter hole or recess 46 has been cut which is currently 5.5 mm deep. This hole 46 accepts the cylindrical template 50, preferably Copper, and 12 mm diameter by 6 mm deep. The template 50 is held in the fixture 40 so that a flat surface 60 is presented to the electrode 22 for redressing.

Adjustment of the template 50 occurs after each redress. The template 50 securing bolt 48 is manually loosened and the cylindrical template 50 turned a few degrees by hand. This operation is simple because the fixture 40 defines openings 62 to allow thumb and finger access to the sides, or outer circumference surface 68, of the template 50. After the template 50 has been rotated the securing screw can be hand tightened. As the electrode 22 contacts the template 50 off centre and the insert is rotated, this adjustment method allows substantially complete 360-degree use of the surface of the insert. Operator adjustments of the template 50 do not move the overall location of the insert and therefore when the template is swung in/out of position, there will be no contact with the electrode nose guide 14.

Once a full rotation has occurred the fixture 40 is moved, usually a few millimetres, to the side until the electrode is again presented a fresh surface to circumscribe. The bolts 52 and elongate holes 54 enable such movement. As before, the template 50 is rotatable through increments, depending on electrode 22 size and redressing contact point spacing, up to 360 degrees. The above steps of rotating the template 50 to circumscribe contact points and redefining a new radius for contact may be repeated a number of times and will allow redressing to occur on an unscarred area, for the size of template 50 in this example, over 30 times.

The present invention further comprises turning the template 50 over and using the opposite side in similar fashion. This extends the life of the insert to over 60 redressing operations.

Thus the present invention is substantially simpler to use than the existing method and apparatus. The rotational adjustments are much simpler and quicker reducing machining time, cost and improving quality. The template 50 is also much easier to position for a new area to be used because the inserts movement is restricted to only a rotational movement. This restricted movement will also reassure the operator that the insert location is correct. The size, shape and the position of the insert allows a relatively large surface area of template 50 without the possibility of making contact with the electrode nose guide 14 during swinging movements.

Further advantages of the present invention are a reduction in the amount of material used, e.g. copper bar. Additionally, significant time is saved in production of the finished component and it is expected that the ease of use will mean that the template is adjusted more regularly than current practice, leading to less rework, concessions and scrap, reducing the costs these entail.

Preferably, although not exclusively, the template 50 comprises a roughened outer circumferential surface 68, thereby easing manual rotation.

Various embodiments of the present invention are now described and it should be readily understood to the skilled artisan that any one or any combination of these embodiments may be combined together to be within the scope of the present invention.

The embodiments of FIGS. 4a and b comprise corresponding interlocking features 66 and 64 on the fixture 40 and template 50 respectively. Rotation of the template 50 is about the axis 58. In FIG. 4a, both the recess 46 and the template's 50 outer perimeter comprise flats 66. In FIG. 4b, the interlocking features 64 are essentially intermeshing geared teeth 64. In both examples the number of flats 66 or teeth 64 correspond to the number of contact points around a particular substantially circular path. The number of flats or teeth may be designed for a corresponding number of contact points, dependent on the size and spacing of the electrode 22 and the diameter of the disc and/or the diameter of the circle subscribed by the contact points. Each new contact position will require the additional step of lifting the template clear of the fixture before rotating and replacing.

The embodiments of FIGS. 5a and 5b comprise the axis 58 of the template 50 perpendicular to the general direction of the electrode 22 as it moves towards contacting the template 50. Where a relatively large diameter template 50 and a relatively small electrode end surface is used, the curved contact surface is approximately flat. Otherwise, in FIG. 5b, a template 50 comprising flats 66 with a correspondingly shaped recess similar to FIG. 4a is used. The means 44 for holding a template 50 is similar to that described hereinbefore.

Referring to FIG. 5c, the embodiment described with reference to FIGS. 5a and 5b is further enhanced where a machine 10 has a housing 12 in which multiple electrodes 22 are used via nose guides 14. The holder 40 carries a rotatable and flat sided template 50 elongated in the axial direction to accommodate the multiple electrodes 22. Suitable means may be incorporated to rotate and hold the template 50 as herein described.

Referring to FIG. 6, a further embodiment of the means 44 to hold a template and allow rotation comprises a worm threaded bolt 70, disposed within the fixture 40, and arranged to engage corresponding thread formed by the outer circumferential surface 68 of the template 50. Thus manual and controlled rotation of the template 50 is easily made by rotation of the threaded bolt 70.

FIG. 7 shows a rack and pinion 72 arrangement as the means 44 to hold a template and allow rotation thereof. Manual rotation of a bolt 78 drives the rack 80, which in turn rotates the pinion or template 50 about its axis 58. In this embodiment as in that of FIG. 6 the template 50 is mounted on pin 74, extending from the fixture 40 through a hole 76 defined by the template 50. This embodiment allows the user to govern the amount of rotation where the EDM operation uses different sized electrodes 22 and therefore different spacing between contact centres.

FIG. 8 shows a template 50 comprising an annular array of angled teeth 82 which are engaged by a complimentarily shaped and sprung arm 84 attached to the fixture 40 as the means 44 to hold a template and allow rotation thereof. The shape of the teeth 82 and the arrangement of the arm 84 are such that only rotation in the direction of arrow 86 is possible and that the amount of rotation is predetermined. Where similar spacing between contact centres is desirable, this embodiment allows the required predetermined amount of rotation, particularly where the EDM operation uses similar sized electrodes 22. The sprung arm 84 may either be flexible and bend in the direction of rotation of the template 50 or comprise a resilient means which provides a returning force to the holding position as shown in the figure.

FIGS. 9a and 9b show a template 50 comprising an annular array of angled teeth 82 which are engaged by a complimentarily shaped and sprung arm 84 attached to the fixture 40 as the means 44 to hold a template and allow rotation thereof. The sprung arm 84 mechanism is disposed within the fixture 40, but also comprises a button 88 extending from a surface thereof. The sprung mechanism 84 is captured between lands 90 of the fixture 40, and comprises a spring 86 or other similar resilient means to provide a returning force to the arm 84 when a user presses the button 88 to rotate the template 50. This embodiment further simplifies the user interaction to provide a predetermined amount of rotation; particularly where the EDM operation uses similar sized electrodes 22.

An advantage both embodiments of FIGS. 8 and 9 enjoy is the means 44 to hold a template and allow rotation thereof produces and audible click noise to indicate to the user that rotation is complete.

It should be readily understood to the skilled artisan that many different forms of attachment between the fixture 40 and the base 30 may be used without departing from the scope of the present invention. For example, the template 40 may be releasably secured via clamps or magnetic means or be slidably mounted on a dovetail/rail arrangement as known in the art.

FIG. 10 shows a further embodiment of the present invention where the means 44 to hold and rotate a template 99 comprise an extension 92 of a static part of the EDM 10, in this case the housing 12. The extension 92 itself comprises a means 94 to engage the template 99 and rotate it. Such a means 94 comprises the mechanism described with reference to FIG. 8, notably the sprung arm 84 which engages teeth 82 formed on the template 50. Thus, as the arm 16 automatically swings away from and back to the EDM 10, the sprung arm 84 rotates the template 50 to rotate it. In this embodiment an advantage is that the user does not need to adjust the template 50 as it is rotated automatically. The user need only replace or turn over the template once a complete revolution of contact points has been made. It should be appreciated therefore that this mechanism is not so dependent on the user and thus quality repeatability and time savings are immediately apparent.

Furthermore, FIG. 11 shows another automated means 44 to hold and rotate a template 99 comprising an electric motor 96 drivingly connected to the template 50. The electric motor 96 is housed in the fixture 40 or alternatively may be positioned on any part of the arm 16 or EDM machine where corresponding linkages are arranged to suitably rotate the template 99. The electric motor 96 is connected to a control device 98, which automatically powers the motor 96 in response to and during a machining operation. An indicator 100, audible or visual, is provided and is capable of warning the user that a complete rotation of contact points has been completed or requires replacement and that the template 50 requires turning over or the fixture 40 requires moving.

It is anticipated that more than one electrode 22 may be used and be redressed on a single template 50, alternatively several fixtures may be used with appropriately disposed electrodes 22.

The present invention as described with reference to and shown in the drawings therefore provides a method and apparatus to improve utilisation of a redressing template, user and operation time, to reduce the scrap rate of components and/or their rework rate, to improve repeatability of redressing the electrode and improve the quality of the hole formed in the component. Each of these advantages significantly reduces the cost of the EDM operation.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An electric discharge machine template fixture suitable for EDM electrode redressing operations, the fixture comprising:
    a body comprising a formation constructed to hold a template and allow rotation of the template about its central axis for consecutive electrical current redressing operations, wherein the formation generally conforms to the shape of the template.

2. An electric discharge machine template fixture as claimed in claim 1 wherein the central axis is arranged substantially parallel to the direction of travel of the electrode in the redressing operation.

3. An electric discharge machine template fixture as claimed in claim 1 wherein the central axis is arranged substantially perpendicular to the direction of travel of the electrode in the redressing operation.

4. An electric discharge machine template as claimed in claim 1, wherein the template comprises an outer circumferential surface wherein a thread is formed by the outer circumferential surface of the template which is capable of rotational engagement by a complimentary worm threaded bolt disposed to the fixture.

5. An electric discharge machine template fixture as claimed in claim 1 wherein the formation and template are substantially circular or part circular.

6. An electric discharge machine template fixture as claimed in claim 1 wherein the formation and template are polygonal or part polygonal.

7. An electric discharge machine template fixture as claimed in claim 6 wherein the number of sides of the polygon conforms to the number of times the template is capable of being part rotated in one complete revolution.

8. An electric discharge machine template fixture as claimed in claim 1 wherein the formation comprises interlocking features which are capable of interlocking with corresponding features formed on the template.

9. An electric discharge machine template fixture as claimed in claim 8 wherein the number of interlocking features conforms to the number of times the template is capable of being part rotated in one complete revolution.

10. An electric discharge machine template fixture as claimed in claim 1 wherein the formation for holding a template and allow rotation comprises a worm threaded bolt, disposed to the fixture, and arranged to engage a corresponding thread formed by the outer circumferential surface of the template.

11. An electric discharge machine template fixture as claimed in claim 1 wherein the formation for holding a template and allow rotation thereof comprises a rack and pinion arrangement, in use rotation of a bolt, drivingly connected to the rack, drives the rack, which engages and rotates the pinion about its axis.

12. An electric discharge machine template suitable for use in a complimentary electric discharge machine template fixture and capable of redressing an EDM electrode, the fixture comprises holding means for engaging the template to prevent rotation thereof, having a sprung arm attached to the fixture capable of engaging a template, wherein the template comprises an annular array of angled teeth, the shape of the teeth and the arrangement of the arm allow rotation only in one direction of a predetermined amount.

13. A method of electric discharge machining, the electric discharge machine comprising:
 a housing;
 an electrode nose guide;
 a movable arm; and
 a fixture for holding a component to be machined, the movable arm is arranged to carry a template fixture suitable for electrode redressing operations, the method comprises the steps of:
   d) machining the component;
   e) pivoting the arm into a position to permit redressing of the electrode on the template; and
   f) rotating a template being held in the template fixture about its central axis for consecutive redressing operations.

14. A method of electric discharge machining as claimed in claim 13 wherein the redressing step comprises reversing an electric current.

15. An electric discharge machine template fixture suitable for EDM electrode redressing operations, the fixture comprising:
 a body having means for holding a template, wherein the means is capable of allowing rotation of the template about its central axis for consecutive electrical current redressing operations, and wherein the means for holding a template and allow rotation thereof comprises a sprung arm attached to the fixture and capable of engaging a complimentarily shaped template, the template comprising an annular array of angled teeth.

16. An electric discharge machine template fixture as claimed in claim 15 wherein the sprung arm mechanism comprises a button extending from a surface of a fixture, the sprung mechanism is captured between lands of the fixture, and comprises a spring or other similar resilient means for providing a returning force to the arm subsequent to a user pressing the button and capable of rotating the template a predetermined amount.

17. An electric discharge machine template fixture suitable for EDM electrode redressing operations, the fixture comprising:
 a body having means for holding a template, wherein the means is capable of allowing rotation of the template about its central axis for consecutive electrical current redressing operations, the means for holding a template and allow rotation thereof comprises an extension of a static part formed on the template, and when the arm automatically swings away from and back to the static part the arm rotates the template a predetermined amount.

18. An electric discharge machine template fixture suitable for EDM electrode redressing operations, the fixture comprising:
 a body having means for holding a conductive template, wherein the means is capable of allowing rotation of the template about its central axis for consecutive electrical current redressing operations, wherein an indicator, audible or visual, is provided and is capable of warning the user that a complete rotation of contact points has been completed or requires replacement and that the template requires turning over or the fixture requires moving.

19. An electric discharge machine template suitable for use in a complimentary electric discharge machine template fixture and capable of redressing an EDM electrode, characterized in that the template is polygonal or part polygonal.

20. An electric discharge machine template as claimed in claim 19 wherein the number of sides of the polygon conforms to the number of times the template is capable of being part rotated in one complete revolution of the fixture.

21. An electric discharge machine template suitable for use in a complimentary electric discharge machine template fixture and capable of redressing an EDM electrode, characterised in that the template comprises interlocking features which are capable of interlocking with corresponding features formed by the fixture.

22. An electric discharge machine template as claimed in claim 21 wherein the number of interlocking features conforms to the number of times the template is capable of being part rotated in one complete revolution.

* * * * *